United States Patent
Radulescu et al.

(10) Patent No.: US 10,736,076 B2
(45) Date of Patent: Aug. 4, 2020

(54) METHODS AND APPARATUS FOR PAGING IN UNLICENSED COMMUNICATION CHANNELS

(71) Applicant: QUALCOMM Incorporated, San Diego, CA (US)

(72) Inventors: Andrei Radulescu, San Diego, CA (US); Tao Luo, San Diego, CA (US); Chirag Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/408,233

(22) Filed: Jan. 17, 2017

(65) Prior Publication Data

US 2017/0230933 A1 Aug. 10, 2017

Related U.S. Application Data

(60) Provisional application No. 62/291,491, filed on Feb. 4, 2016.

(51) Int. Cl.
*H04W 84/02* (2009.01)
*H04W 72/12* (2009.01)
(Continued)

(52) U.S. Cl.
CPC .......... *H04W 68/02* (2013.01); *H04W 16/14* (2013.01); *H04W 68/00* (2013.01);
(Continued)

(58) Field of Classification Search
CPC . H04W 76/046; H04W 76/048; H04W 76/05; H04W 76/06; H04W 76/08;
(Continued)

(56) References Cited

U.S. PATENT DOCUMENTS

2009/0310503 A1* 12/2009 Tenny ................... H04W 68/00
370/252
2010/0202400 A1* 8/2010 Richardson ........... H04W 8/005
370/330
(Continued)

FOREIGN PATENT DOCUMENTS

WO WO-2015133825 A1 * 9/2015 .......... H04J 11/0069
WO WO-2015167232 A1 11/2015
WO WO-2016028505 A1 2/2016

OTHER PUBLICATIONS

Huawei., et al., "CR to Capture LAA Agreements", 3GPP Draft, 36300 CR0798 (REL-13) R2-156218 CR for LAA, 3RD Generation Partnership Project (3GPP), Mobile Competence Centre, 650, Route Des Lucioles, F-06921 Sophia-Antipolis Cedex, France, vol. RAN WG2, No. Anaheim, USA, Nov. 16, 2015-Nov. 20, 2015, Nov. 16, 2015 (Nov. 16, 2015), XP051005493; 9 pages, Retrieved from the Internet: URL: http://www.3gpp.org/ftp/Meetings_3GPP_SYNC/RAN2/Docs/.
(Continued)

*Primary Examiner* — San Htun
(74) *Attorney, Agent, or Firm* — Paradice and Li LLP /Qualcomm

(57) ABSTRACT

Certain aspects of the present disclosure relate to a methods and apparatus for wireless communication. In one aspect, a method of wireless communication comprises assigning, by an access point, an interval of time for transmission on an unlicensed communication spectrum to a LTE-U device, and broadcasting an anchor signal during the interval of time on the unlicensed communication spectrum, the anchor signal comprising a paging indication for the LTE-U device. In another aspect, a method of wireless communication comprises determining, by a LTE-U device, an interval of time for reception of a paging indication on an unlicensed communication spectrum and receiving an anchor signal during the interval of time on the unlicensed communication spectrum, the anchor signal comprising the paging indication.

28 Claims, 7 Drawing Sheets

(51) Int. Cl.
*H04W 76/28* (2018.01)
*H04W 68/02* (2009.01)
*H04W 68/00* (2009.01)
*H04W 16/14* (2009.01)
*H04W 74/08* (2009.01)

(52) U.S. Cl.
CPC ........ *H04W 74/0833* (2013.01); *H04W 72/12* (2013.01); *H04W 76/28* (2018.02); *H04W 84/027* (2013.01)

(58) Field of Classification Search
CPC ..... H04W 76/14; H04W 76/15; H04W 76/17; H04W 76/24; H04W 76/25; H04W 76/27; H04W 76/32; H04W 76/33; H04W 76/35
See application file for complete search history.

(56) References Cited

U.S. PATENT DOCUMENTS

| | | | | |
|---|---|---|---|---|
| 2012/0113904 | A1* | 5/2012 | Anderson | H04W 76/28 370/329 |
| 2012/0207040 | A1* | 8/2012 | Comsa | H04W 72/1215 370/252 |
| 2012/0275365 | A1* | 11/2012 | Anderson | H04W 52/0219 370/311 |
| 2013/0003629 | A1* | 1/2013 | Jeong | H04W 52/0216 370/311 |
| 2013/0136072 | A1* | 5/2013 | Bachmann | H04W 4/00 370/329 |
| 2013/0229965 | A1* | 9/2013 | Bressanelli | H04W 52/0216 370/311 |
| 2015/0031382 | A1* | 1/2015 | Damnjanovic | H04W 52/0216 455/452.1 |
| 2015/0215847 | A1* | 7/2015 | Yie | H04W 48/08 455/434 |
| 2016/0073344 | A1* | 3/2016 | Vutukuri | H04W 52/0216 370/252 |
| 2016/0073366 | A1* | 3/2016 | Ng | H04W 56/001 370/329 |
| 2017/0094543 | A1* | 3/2017 | Narasimha | H04L 5/0048 |
| 2017/0223667 | A1* | 8/2017 | Yi | H04J 11/0069 |

OTHER PUBLICATIONS

International Search Report and Written Opinion—PCT/US2017/013968—ISA/EPO—dated Apr. 11, 2017.

* cited by examiner

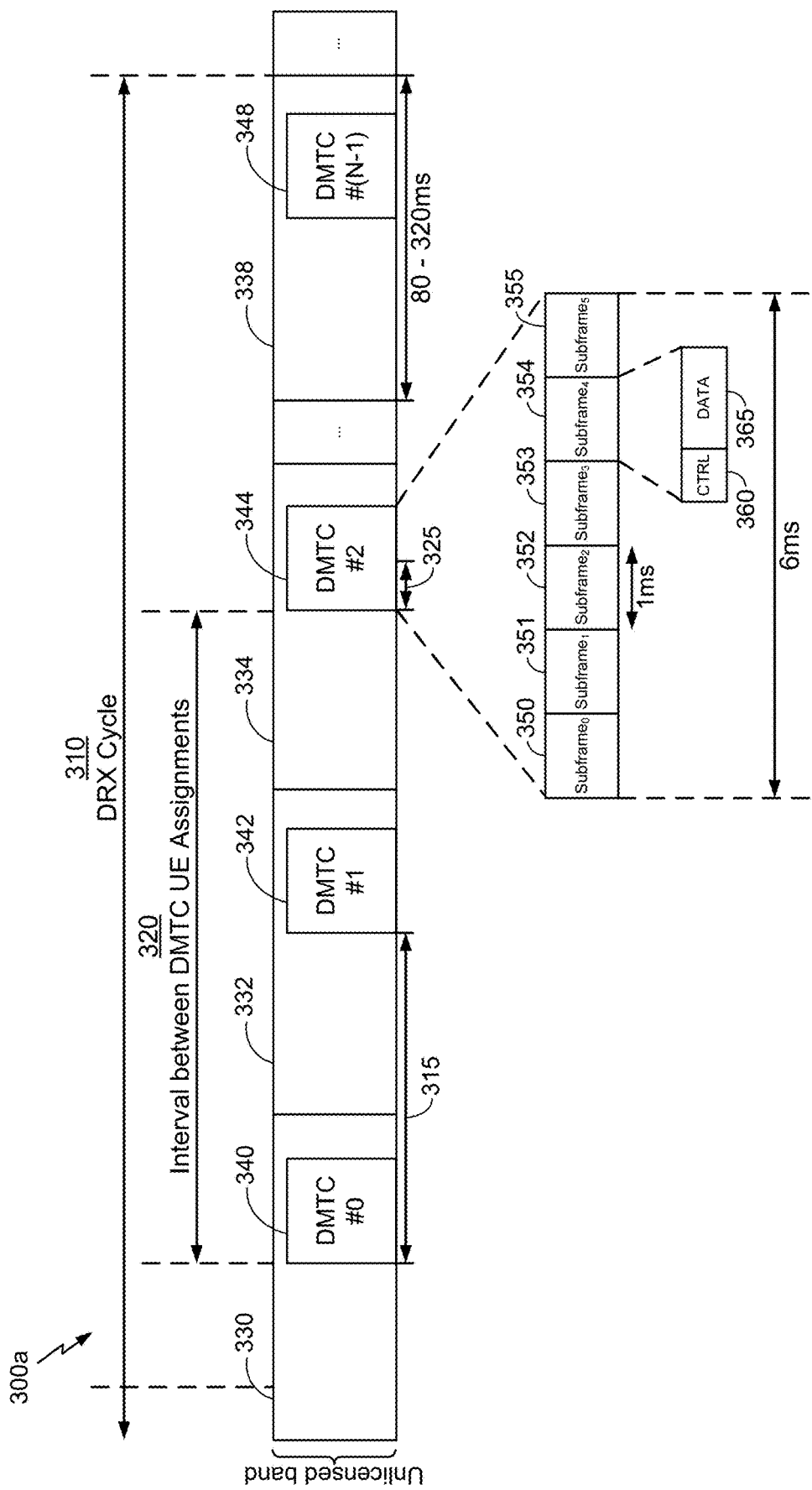

METHODS AND APPARATUS FOR PAGING IN UNLICENSED COMMUNICATION CHANNELS

CROSS REFERENCE TO RELATED APPLICATIONS

This application claims priority to U.S. Provisional Patent Application No. 62/291,491, filed Feb. 4, 2016 and entitled "METHODS AND APPARATUS FOR PAGING IN UNLICENSED COMMUNICATION CHANNELS." The disclosure of this prior application is considered part of this application, and is hereby incorporated by reference in its entirety.

BACKGROUND

Field

Certain aspects of the present disclosure generally relate to wireless communications, and more particularly, to methods and apparatus for paging in unlicensed communication channels.

Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), LTE Unlicensed (LTE-U), LTE Direct (LTE-D), License-Assisted Access (LAA), MuLTEfire, etc. These systems may be accessed by various types of user equipment (UE) adapted to facilitate wireless communications, where multiple UEs share the available system resources (e.g., time, frequency, and power).

For the volume and complexity of information communicated wirelessly between multiple devices, the required overhead bandwidth continues to increase. Devices may operate in close proximity to one another and operating over different radio access technologies (RATs) and/or different communication protocols. It may be desirable to coordinate, for example, communications between devices of different operators operating on a same unlicensed channel.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises assigning, by an access point, an interval of time for transmission on an unlicensed communication spectrum to a long term evolution unlicensed (LTE-U) device. The method further comprises broadcasting, by the access point, an anchor signal during the interval of time on the unlicensed communication spectrum, the anchor signal comprising a paging indication for the LTE-U device.

Another aspect of the disclosure provides an apparatus for wireless communication, such as an access point. The apparatus comprises a processor configured to assign an interval of time for transmission on an unlicensed communication spectrum to a long term evolution unlicensed (LTE-U) device. The apparatus further comprises a transmitter configured to broadcast an anchor signal during the interval of time on the unlicensed communication spectrum, the anchor signal comprising a paging indication for the LTE-U device.

Another aspect of the disclosure provides an apparatus for wireless communication, such as an access point. The apparatus comprises means for assigning an interval of time for transmission on an unlicensed communication spectrum to a long term evolution unlicensed (LTE-U) device. The apparatus further comprises means for broadcasting an anchor signal during the interval of time on the unlicensed communication spectrum, the anchor signal comprising a paging indication for the LTE-U device.

Another aspect of the disclosure provides a non-transitory computer-readable medium having stored thereon instructions that, when executed, cause a processor of an access point to assign an interval of time for transmission on an unlicensed communication spectrum to a long term evolution unlicensed (LTE-U) device, and broadcast an anchor signal during the interval of time on the unlicensed communication spectrum, the anchor signal comprising a paging indication for the LTE-U device.

One aspect of the disclosure provides a method of wireless communication. The method comprises determining, by a long term evolution unlicensed (LTE-U) device, an interval of time for reception of a paging indication on an unlicensed communication spectrum. The method further comprises receiving, by the LTE-U device, an anchor signal during the interval of time on the unlicensed communication spectrum, the anchor signal comprising the paging indication.

Another aspect of the disclosure provides an apparatus for wireless communication, such as a long term evolution unlicensed (LTE-U) device. The apparatus comprises a processor configured to determine an interval of time for reception of a paging indication on an unlicensed communication spectrum. The apparatus further comprises a receiver configured to receive an anchor signal during the interval of time on the unlicensed communication spectrum, the anchor signal comprising the paging indication.

Another aspect of the disclosure provides an apparatus for wireless communication, such as a long term evolution unlicensed (LTE-U) device. The apparatus comprises means for determining an interval of time for reception of a paging indication on an unlicensed communication spectrum. The apparatus further comprises means for receiving an anchor signal during the interval of time on the unlicensed communication spectrum, the anchor signal comprising the paging indication.

Another aspect of the disclosure provides a non-transitory computer-readable medium having stored thereon instructions that, when executed, cause a processor of a long term evolution unlicensed (LTE-U) device to determine an interval of time for reception of a paging indication on an unlicensed communication spectrum, and receive an anchor signal during the interval of time on the unlicensed communication spectrum, the anchor signal comprising the paging indication.

BRIEF DESCRIPTION OF THE DRAWINGS

FIG. 3A illustrates an exemplary time sequence diagram of communications in an unlicensed spectrum, in accordance with an embodiment.

DETAILED DESCRIPTION

Figure 1:
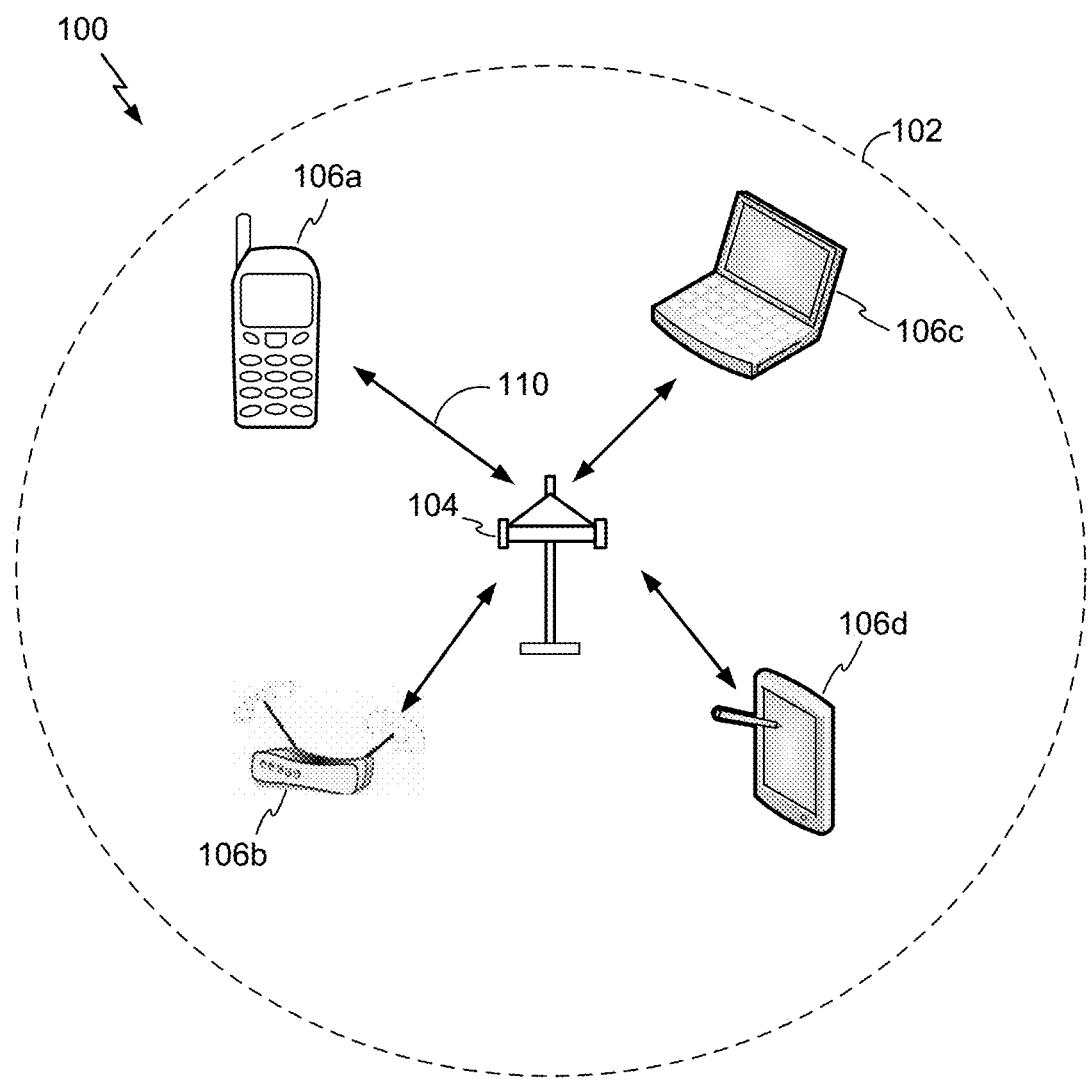
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points ("APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area access networks. In some implementations an STA may also be used as an AP.

An access point ("AP") may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

The disclosed techniques may also be applicable to technologies and the associated standards related to LTE-A, LTE-U, LTE-D, LTE, MuLTEfire, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. MuLTEfire is an LTE-based technology that solely operates in unlicensed spectrum, and doesn't require an "anchor" in licensed spectrum. Terminologies associated with different technologies can vary. LTE-D is a device-to-device technology that utilizes the licensed LTE spectrum and was released as part of 3GPP Release 12. LTE-D devices can communicate directly with other devices by sending a message in the network allocated slot and bandwidth.

In some embodiments, depending on the technology considered, the User Equipment (UE) used in UMTS can sometimes be called a mobile station, a station (STA), a user terminal, a subscriber unit, an access terminal, etc., to name just a few. Likewise, Node B used in UMTS can sometimes be called an evolved Node B (eNodeB or eNB), an access node, an access point, a base station (BS), HRPD base station (BTS), and so forth. It should be noted here that different terminologies apply to different technologies when applicable.

FIG. 1 illustrates an example of a wireless communication system 100 (or network) in which aspects of the present disclosure may be employed. The wireless communication system 100 may include user equipment (UE) 106a-c (referred to herein as "user equipment 106"), which may be in wireless communication with one or both of a cellular network (e.g., a 2G, 3G, 4G LTE, LTE-U, LTE-D, and/or MuLTEfire network) through a eNB 104 or with a non-cellular network (e.g., wireless local area network (WLAN)) through the eNB 104, or some other access point (AP) (not illustrated).

The wireless communication system 100 may include operation pursuant to a wireless standard, for example the 802.11ah, 802.11ac, 802.11n, 802.11g, 802.11b, or other 802.11 based standard. As shown in FIG. 1, the eNB 104 may provide cellular communication coverage in an area 102. The UE 106 may comprise a wireless device that is located within the coverage area 102. The UE 106 may communicate with the eNB 104 over communication link 110 using a cellular network (e.g., LTE), functioning as an LTE UE. The communications exchanged between devices in the wireless communication system 100 may include data units, which may comprise packets, frames, subframes, bits, etc.

Broadly speaking, radio frequency (RF) spectrum may be divided into licensed and unlicensed spectrums (also referred to herein as licensed and unlicensed "bands"). In some aspects, a wireless device (e.g., UE 106 or eNB 104) operating in accordance with an LTE standard may be operating in one or both of the licensed and unlicensed spectrums. For example, a licensed spectrum can include frequencies that are reserved for cellular wireless communications (e.g., communications operating in accordance with an LTE standard). However, an unlicensed spectrum generally does not have reserved frequencies, and devices of varying capabilities may have coexisting operations within the unlicensed spectrum. For example, WLAN devices and LTE devices may both operate within an unlicensed spectrum, and may not have exclusive use of the spectrum. Thus, users of an unlicensed spectrum are subject to interference by other users. LTE devices operating in the unlicensed frequency spectrum may be referred to as "LTE-U" or "MuLTEfire" devices. In some embodiments, the UE 106 may communicate with the UE 106 according to a License Assisted Access (LAA) protocol, which may use both licensed and unlicensed spectrums. However, sharing communication resources, such as the frequency spectrum and the available operating times, in wireless communications can create coexistence problems. The techniques described herein, while generally intended for unlicensed bands, can be applied to other kinds of bands, as they are meant to facilitate low-coordination deployment of access points.

For example, in some aspects, the eNB 104 may communicate with the UE 106 over an unlicensed spectrum utilizing a time division multiplexing (TDM) protocol, which can provide fairness in accessing the wireless medium. However, as part of the TDM protocol, the eNB 104 may only be able to transmit certain information to all of the UEs 106 during limited periods of time. This contrasts with communications on a licensed spectrum, which generally utilizes a continuous reception protocol. Thus, communication over an unlicensed spectrum may occur less frequently than communication over a licensed spectrum in some instances.

In certain embodiments, the eNB 104 may attempt to communicate information to a UE 106 based on the TDM protocol during periods of time referred to as "configuration windows" or downlink monitoring transmission configuration (DMTC) windows. Another name for these periods of time may be downlink transmission windows (DTxW). For example, in some aspects, the eNB 104 may transmit or broadcast anchor signals to the UE 106 during a DMTC window. In some embodiments specific to TDM access, these anchor signals can contain paging indicators, which may indicate that the eNB 104 has data for a specified UE 106. For example, the eNB 104 may transmit or broadcast an anchor signal with a paging indicator to the UE 106a to indicate that there is a message for the UE 106a. However, in contrast to communications on a licensed spectrum, the eNB 104 may have a lower success rate of transmitting paging indicators (or other information). For example, for communication on a licensed spectrum, an eNB 104 may assign a 1 ms paging opportunity to each UE 106, per paging Discontinuous Reception (DRX) cycle 310 (e.g., every 160 ms), and the eNB 104 does not have to contend for the wireless communication medium to transmit paging information to the UE 106 during this 1 ms. In some aspects, licensed spectrum may not normally use of the concept of DMTC for paging, since the signal is normally available and of known waveform at all times. In contrast, in LTE-U or MuLTEfire, the transmission of information to a UE 106 may depend upon whether or not the eNB 104 is able to secure the wireless medium, as other devices may also attempt to secure the wireless medium for their own communications at the same time as the eNB 104 (e.g., the wireless medium may be occupied). Thus, an eNB 104 may not be able to guarantee ahead of time that a previously scheduled paging opportunity in LTE-U or MuLTEfire will occur, which may require retransmission, accounting for an additional delay in communications. Further, as in 5G, LTE-U or MuLTEfire deployment may be dense (e.g., involve many devices), and therefore, chances of the eNB 104 securing the medium for transmission may decrease. Thus, embodiments described herein relate to providing methods of providing paging opportunities and/or data via an unlicensed spectrum.

Figure 2:
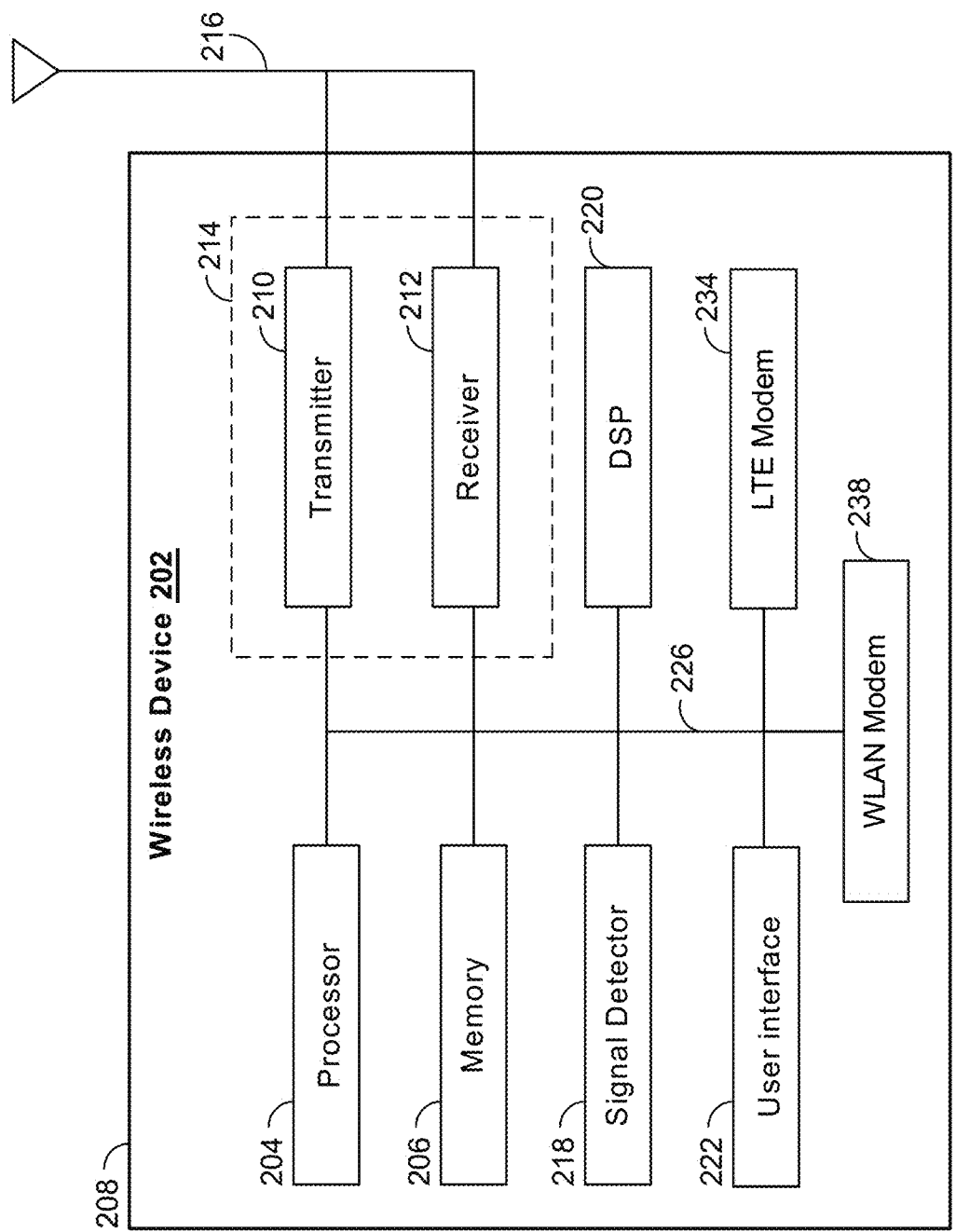
FIG. 2 illustrates various components that may be utilized in a wireless device that may be employed within the wireless communication system of FIG. 1.

FIG. 2 illustrates various components that may be utilized in a wireless device 202 for operation within the wireless communication system 100 of FIG. 1. For example, the wireless device 202 may operate as the eNB 104 or any of the UE 106. In an exemplary implementation, the wireless device 202 may be configured and used in accordance with the various methods described herein.

The wireless device 202 may include an electronic hardware processor 204 which controls operation of the wireless device 202. The processor 204 may also be referred to as a central processing unit (CPU) or hardware processor. Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. The processor 204 may further comprise a packet generator to generate packets for controlling operation and data communication.

The wireless device 202 may include a transmitter 210 and a receiver 212 to allow transmission and reception of data between the wireless device 202 and a remote location. The transmitter 210 and receiver 212 may be combined into a transceiver 214. An antenna 216 may be electrically coupled to the transceiver 214. The wireless device 202 may also include (not shown) multiple transmitters, multiple receivers, multiple transceivers, and/or multiple antennas, which may be utilized during multiple-input multiple-output (MIMO) communications, for example. In some embodiments, each of the multiple antennas may be dedicated for the transmission and/or reception of LTE-U, LTE-D, MuLTEfire, and/or WLAN communications. The wireless device may be covered by a housing unit 208.

The wireless device 202 may also comprise an LTE modem 234 for communicating with LTE devices (e.g., LTE-U, LTE-D, MuLTEfire devices). For example, the LTE modem 234 can enable the wireless device 202 to send, receive, and process LTE communications. The LTE modem 234 may contain processing capabilities to operate in both the physical (PHY) layer and the medium access control (MAC) layer for an LTE network. The wireless device 202 also comprises a WLAN Modem 238 for communicating with WLAN devices. For example, the WLAN Modem 238 can enable the wireless device 202 to send, receive, and process WLAN communications. The WLAN Modem 238 may contain processing capabilities to operate in both the physical (PHY) layer and the medium access control (MAC) layer for WLAN.

The wireless device 202 may also include a signal detector 218 that may be used in an effort to detect and quantify the level of signals received by the antenna 216, transmitter 210, receiver 212 or transceiver 214. The signal detector 218 may detect such signals in a form of detecting total energy, energy per subcarrier per symbol, power spectral density and others. The wireless device 202 may also include a digital signal processor (DSP) 220 for use in processing signals. The DSP 220 may be configured to generate a data unit for transmission. In some aspects, the data unit may comprise a physical-layer protocol data unit (PPDU). In some aspects, the PPDU is referred to as a packet. The DSP 220 may operationally connected to the processor 204 and may share resources with the processor 220.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

Various components of the wireless device 202 may be coupled together by a bus system 226. The bus system 226 may include a data bus, for example, as well as a power bus, a control signal bus, and a status signal bus in addition to the data bus. Those of skill in the art will appreciate various components of the wireless device 202 may be coupled together or accept or provide inputs to each other using some other mechanism.

Although a number of separate components are illustrated in FIG. 2, those of skill in the art will recognize that one or more of these components may be implemented not only with respect to the functionality described above, but also to implement the functionality described above with respect to other components. For example, the processor 204 may be used to implement not only the functionality described above with respect to the processor 204, but also to implement the functionality described above with respect to the signal detector 218 and/or the DSP 220. Each of the components illustrated in FIG. 2 may be implemented using a plurality of separate elements.

As noted above, the wireless device 202 may comprise the eNB 104 or the UE 106, and may be used to transmit and/or receive communications over licensed or unlicensed spectrums. Specifically, the eNB 104 or the UE 106 may comprise a WLAN, LTE-U, or MuLTEfire device configured to operate in an unlicensed spectrum. FIG. 3A illustrates an exemplary time sequence diagram 300a of communications in an unlicensed spectrum (also referred to as an "unlicensed band"), in accordance with an embodiment. In certain embodiments, the illustrated unlicensed band can be a physical dedicated control channel (PDCCH).

As illustrated, the time sequence diagram 300a comprises a plurality of discrete DMTC periods 330, 332, 334, 338 (also referred to herein as "transmission periods"). During each DMTC period 330, 332, 334, 338, devices of varying capabilities may attempt to gain access of the unlicensed spectrum to transmit data. For example, as noted above, an eNB 104 may attempt to access the wireless medium to transmit or broadcast anchor signals during a DMTC window. In some aspects, each DMTC period can be 80 ms, 160 ms, or 320 ms.

As illustrated, a plurality of DMTC windows 340, 342, 344, 348 are spread out across a DRX cycle 310. The DMTC windows 340, 342, 344, 348 may only occur for a specified period of time. For example, in an embodiment, the DMTC window 344 may be 6 ms in length. In accordance with this embodiment, the eNB 104 may have a 6 ms window to access the wireless medium and transmit one or more anchor signals (or other signals) to listening UEs 106. In some aspects, each successive DMTC window 340, 342, 344, 348 may be separated from other DMTC windows by a predetermined amount of time or frames, represented by interval 315. For example, the start time of DMTC window 342 may be separated from the start time of adjacent DMTC window 340 or DMTC window 344 by 80 ms, 160 ms, or 320 ms. During the times in which a DMTC window 340, 342, 344, 348 is not present, the UE 106 may be in a "power save," "idle" or "sleep" mode (to save energy or otherwise extend battery life), unless the UE 106 is otherwise attempting to transmit or receive information. In various aspects, each of the times described herein can be determined ahead of time (e.g., set by a specification or configuration) or may be dynamically adjusted, and can vary from one DMTC period 330, 332, 334, 338 to another.

Pilot (e.g., common reference signal (CRS)) scrambling in DMTC subframes 350-355 may be specific to DRS (discovery reference signals) (e.g., the same scrambling can be used in more than one subframe, to facilitate cell discovery and measurement by UEs 106, for example), or may be specific to unicast data transmission (e.g., different scrambling can be used in every subframe 350-355, which may be more suitable for UEs 106 that have already discovered and are possibly served by the eNB's 104 cell). An eNB 104 may choose to limit its paging indication to subframes where the two kinds of pilot scrambling coincide (e.g. subframe$_0$ 350 and subframe$_5$ 355). An eNB 104 may also choose to send paging indicators according to an expected state of paged UEs 106 (e.g., idle UEs 106 can be paged via subframes 350-355 with DRS-scrambled pilots and connected UEs 106 can be paged via subframes 350-355 with subframe-specific pilots).

For the specific case where broadcast system information changes, an eNB 104 can use paging to notify all UEs 106 (e.g., similar to how UEs 106 may obtain system information changes licensed LTE operation), or the eNB 104 may rely on specific classes of UEs 106 (e.g., connected-mode UEs 106) monitoring specific signaling (e.g., in PBCH channel) to determine whether broadcast information system changes. To facilitate UE 106 reception and hypothesis testing, an eNB 104 may send system information change signaling in narrowband fashion (as opposed to utilizing the entire cell bandwidth, for example).

Although one DMTC window is illustrated for each DMTC period 330, 332, 334, 338, in an embodiment, more than one DMTC window may be scheduled for each DMTC period 330, 332, 334, 338. This may be beneficial in an emergency situation, for example, if LTE-U or MuLTEfire devices are utilized for emergency communications, as a larger portion of each DMTC period 330, 332, 334, 338 could be allocated for these communications.

As illustrated, one or more subframes 350-355 may be transmitted during a DMTC window 340, 342, 344, 348. In an embodiment, the duration of each subframe 350-355 can be 1 ms. In some aspects, each of the subframes 350-355 can be anchor signals when they are transmitted by the eNB 104. Anchor signals can comprise a discovery reference signal (DRS), an enhanced discovery reference signal (eDRS), or some other signal.

Each subframe 350-355 may contain a control portion 360 and a data portion 365. In an embodiment, the control portion 360 can indicate one or more UEs 106 that the subframe 354 carries data for within the data portion 365. For example, each UE 106 may be identified by a radio network temporary identifier (RNTI). Accordingly, the control portion 360 may indicate the RNTI(s) of the UE 106 that is/are the intended recipient(s) of the subframe 354, for example. In some aspects, a specialized RNTI may be utilized to indicate that the subframe 354 contains paging indications. For example, the subframe 354 may be addressed to a specific paging RNTI (P-RNTI), and may be broadcast to all UEs 106 that listen to paging indicators in the subframe 354. Thus, a UE 106 that decodes the P-RNTI may determine that the subframe 354 is for paging. If the subframe 354 is for paging, then the data portion 365 may comprise an identifier for each paged UE 106.

If the UE 106a, for example, determines that it was paged in the subframe 354, the UE 106a can initiate a random access channel (RACH) procedure as an initial step towards establishing a connection with the eNB 104 to receive a message (e.g., a message buffered at the eNB 104). Once the UE 106a connects with the eNB 104, the UE 106a may receive the message and enter a power-save or idle mode thereafter. In some aspects, the subframe 354 may be utilized to page up to sixteen UEs 106. However, the more UEs 106 that are paged at a time, the higher the chances that the UEs 106 cause congestion of the wireless medium, as they may all rush to connect to the eNB 104 after being paged. Thus, in some aspects, it may be beneficial to spread paging indications across the DRX cycle 310.

Although references are made to the subframe 354, any of the subframes 350-355 may be utilized for paging, and the location of the paging indications may vary from one DMTC window to another. In an embodiment, a UE 106 may stop listening to subsequent subframes 353-355 if it detects or observes a P-RNTI allocation in one subframe 352 of the DMTC window 344, for example. This may provide additional efficiencies in embodiments where an eNB 104 only utilizes one subframe for paging in each DMTC window, as a UE 106 may avoid using energy during times in which no data is transmitted to the UE 106. In another embodiment, a UE 106 may stop listening to subsequent subframes if it detects a paging message destined to itself in one subframe of the DMTC window 344, for example. This may allow for additional paging messages to be transmitted in a DMTC window, which may be beneficial in an emergency situation, for example.

In some embodiments, paging in an unlicensed spectrum may be restricted to anchor signals (e.g., paging may not occur outside of a DMTC window). In an embodiment, the number of DMTC windows ($N_{DMTC}$) utilized in the DRX cycle 310 may be set to equal the duration of the DRX cycle 310 ($T_{DRX}$) divided by the duration of the DMTC period 330, 332, 334, 338 ($DMTC_{period}$). For example, if $T_{DRX}$ is set to 1.2 sec (e.g., an implementation where UEs 106 may be paged every 1.2 sec) and $DMTC_{period}$ is set to 320 ms, then $N_{DMTC}$ may equal four, as the result is equal to 3.75 DMTC opportunities (e.g., more than three opportunities are available for DMTC windows). In an aspect, the value of $N_{DMTC}$ may correspond to the value of N illustrated in the DMTC window 348. Although seconds and milliseconds are discussed, other variables may be utilized, such as a number of frames. In certain aspects, the length of the DRX cycle 310 may be an integer multiple of the length of the DMTC period. For example, the DRX period may be 32 frames, 64 frames, 128 frames, 256 frames, etc., and the DMTC period may be 4 frames, 8 frames, 16 frames, etc.

In some embodiments, UEs 106 may be further restricted to expect paging only in specific subframes constituting a subset of the DMTC subframes 350-355. The restriction for the number of subframes 350-355 may be via configuration (e.g. broadcast in scheduling information blocks (SIBs)) or via specification. In the case of such restrictions, different UEs 106 may be assigned to expect paging indicators in different subsets of DMTC subframes 350-355. In an embodiment, the different subsets can be a function of a UE's 106 permanent or temporary identity.

In some embodiments, upon determining that an eNB 104 did not transmit any subframe 350-355 where a UE 106 would be normally configured to monitoring paging indicators, the UE 106 may attempt to monitor the presence of paging indicators in a set of fallback subframes 350-355 following the subframe(s) 350-355 that the UE 106 would normally monitor. For example, instead of waiting until the next DMTC DRX cycle 310 paging opportunity, the UE 106 can monitor for a paging indication in the immediately consecutive DMTC window 348, for example, to the DMTC window 344 that the UE 106 could not detect. In another embodiment, instead of waiting until the next DMTC DRX cycle 310 paging opportunity, the UE 106 can monitor for a paging indication in one more subframes starting at a predetermined offset (e.g., 10 milliseconds) from the start of the UE's 106 normally assigned subset of paging subframes 350-355. To match the UE 106 behavior, in some aspects, an eNB 104 may attempt to page the UE 106 again in a fallback subframe(s), upon determining that medium contention or some other reason did not allow the eNB 104 to transmit paging in the normally assigned subframes, for example.

In some embodiments, certain types of UEs 106 (e.g. connected-mode UEs) may be assigned to monitor paging indicators in subframes outside of a DMTC window 340-348. In some aspects, an eNB 104 may use subframe-specific pilot scrambling to page a UE 106 if the paging occurs in subframes outside of a DMTC window 340-348. For example, subframe-specific pilot scrambling may be utilized for connected-mode UEs 106 or for idle-mode UEs 106 that happen to monitor paging indicators outside of a DMTC window 340-348, possibly for fallback reasons.

In some aspects, each UE 106 being paged may be assigned to one of the available DMTC windows 340, 342, 344, 348 based on a random distribution function. For example, in an embodiment, the eNB 104, the UE 106a, or both, may determine a start time of the DMTC window assigned to the UE 106a (represented by reference 320). In an aspect, the start time may be set to equal:

$$(UE_{ID} \bmod N_{DMTC}) * DMTC_{period\_frames} * N_{subframes\_per\_frame} + DMTC_{offset\_frames}$$

In an embodiment, $UE_{ID}$ is the value of an identifier for a UE 106 (e.g., a RNTI or some other identifier), the $DMTC_{period\_frames}$ is equal to a number of frames between the start times of subsequent DMTC windows (e.g., interval 315), the $N_{subframes\_per\_frame}$ is equal to a number of subframes in each frame, and the $DMTC_{offset\_frames}$ is equal to a number of frames after the start of the assigned DMTC window where paging occurs, which may be zero. In some aspects, as illustrated by the offset 325, $DMTC_{offset\_frames}$ can be non-zero. Other formulas for assigning UEs 106 to DMTC windows 340, 342, 344, 348 are possible. Thus, the UE 106a, for example, can listen for a paging indicator at (or after) the determined UE assignment timing 320 to determine whether the eNB 104 is transmitting a paging indication for the UE 106a.

As noted above, the UE 106 may continue to listen for paging indications for the duration of the DMTC window 344, but may choose to stop listening after a paging indication is decoded. During the DMTC window 344 (or before) the eNB 104 can attempt to gain access of the wireless medium to transmit paging indications or other information to the UEs 106. In certain aspects, the eNB 104 may not obtain access to transmit on the wireless medium at the scheduled start time of the DMTC window 344. For example, the eNB 104 may not obtain access to transmit on the wireless medium until 3ms after the scheduled start of the DMTC window 344. In an embodiment, the eNB 104 may then transmit subframes during the remaining 3ms of the DMTC window 344. In accordance with this embodiment, the eNB 104 may transmit paging indications (e.g., P-RNTI) in one of the remaining subframes. Thus, a UE 106 assigned to the DMTC window 344 may obtain a paging indication, even if the eNB 104 did not obtain access to the wireless medium at a predetermined time, and not need to wait for a full DRX cycle 310 before receiving another opportunity to receive the paging indication. Beneficially, latency in wireless communications in an unlicensed spectrum may be decreased. In various aspects, the eNB 104 may gain access to transmit on the wireless medium through various methods of channel assessment or channel contention. For example, the eNB 104 may utilize a higher-priority medium contention mechanism to obtain access to the wireless medium during the DMTC windows 340, 342, 344, 348. In an embodiment, the eNB 104 may utilize a one-shot listen-before-talk (LBT) mechanism.

Figure 3B:
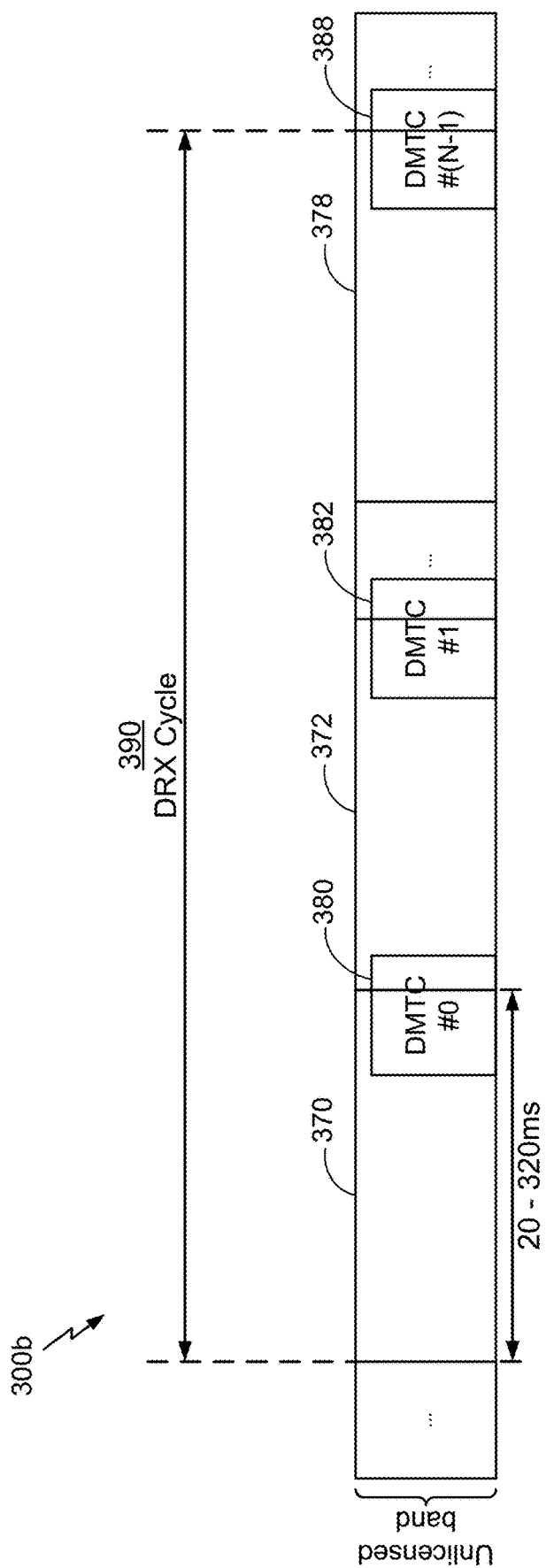
FIG. 3B illustrates another exemplary time sequence diagram of communications in an unlicensed spectrum, in accordance with an embodiment.

In some aspects, a portion of a DMTC window may lie outside of the DMTC period in which it begins. For example, FIG. 3B illustrates another exemplary time sequence diagram 300b of communications in an unlicensed spectrum, in accordance with an embodiment. As illustrated, the time sequence diagram 300b comprises a DRX cycle 390 containing a plurality of DMTC periods 370, 372, 378, each containing a DMTC window 380, 382, 388. As illustrated, the DMTC windows 380, 382, 388 start within one of the plurality of DMTC periods 370, 372, 378, and span into the next DMTC period. Thus, a DMTC window may occur at any time within a DMTC period.

Figure 4A:
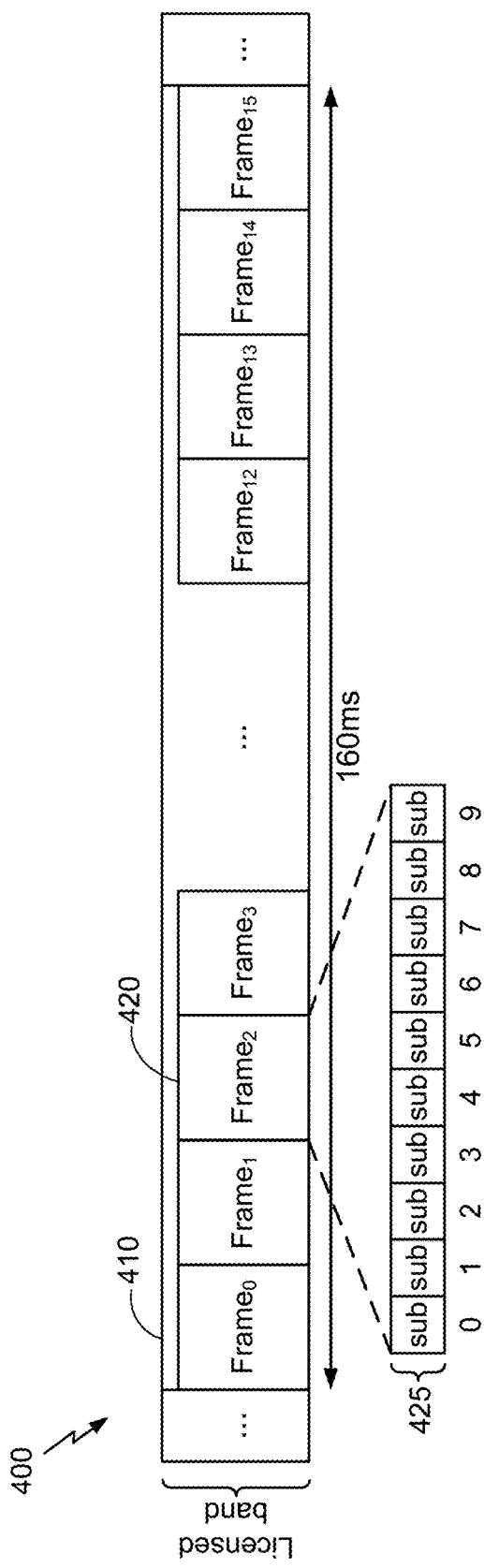
FIG. 4A illustrates an exemplary time sequence diagram of communications in a licensed spectrum, in accordance with an embodiment.

FIG. 4A illustrates an exemplary time sequence diagram 400 of communications in a licensed spectrum (also referred to as a "licensed band"), in accordance with an embodiment. In contrast, FIG. 4B illustrates another exemplary time sequence diagram 450 of communications in an unlicensed spectrum, in accordance with an embodiment.

As illustrated, the time sequence diagram 400 of FIG. 4A comprises a transmission period 410 of 160 ms. In other embodiments, the transmission period 410 may be shorter or longer. Additional transmission periods may also be present before or after the transmission period 410, and may form part of a continuous transmission protocol. As illustrated, a plurality of frames 420 are transmitted within the transmission period 410. As further illustrated, each frame 420 can comprise a plurality of subframes 425. In an embodiment, each frame 420 can be 10 ms in duration, and each of the subframes in the plurality of subframes 425 can be 1 ms in duration. In certain embodiments of communication on a licensed spectrum, four subframes per frame 420 may be utilized as paging opportunities. Thus, in accordance with this embodiment, there may be sixty four paging opportunities in the transmission period 410 of 160 ms.

Figure 4B:
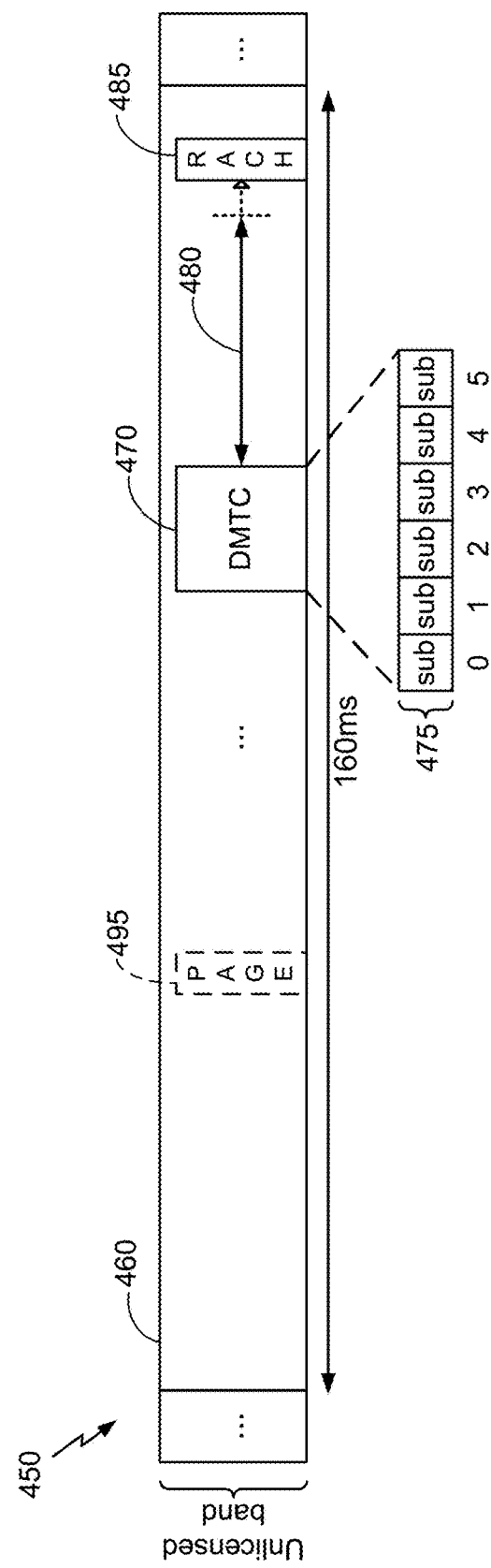
FIG. 4B illustrates another exemplary time sequence diagram of communications in an unlicensed spectrum, in accordance with an embodiment.

Similarly, the time sequence diagram 450 of FIG. 4B comprises a DMTC period 460 of 160 ms. However, in the unlicensed spectrum, paging opportunities might only occur at times when an anchor signal is broadcast. For example, in an embodiment, only one DMTC window 470 may occur within the DMTC period 460. This embodiment may be required or preferred in order to provide fairness in wireless communications in the unlicensed spectrum. As illustrated, a plurality of subframes 475 may be transmitted during the DMTC window 470 (e.g., six subframes), and in some aspects, each subframe may be used as a paging opportunity. However, although six subframes may be possible, it may be preferred that only a portion of the subframes are utilized for paging, or an eNB 104 transmitting during the DMTC window 470 is not able to secure the wireless medium for transmitting all of the plurality of subframes 475. Thus, the number of paging opportunities available in the unlicensed spectrum may be between 10.667 and 64 times less than the number of paging opportunities available in a licensed spectrum of the same length.

Further, if each paging opportunity is used to page multiple UEs 106, and all of the paged UEs 106 attempt to connect to the eNB 104 after they are paged (e.g., immediately after receiving a paging subframe or at the first "RACH anchor" after the paging subframe), the likelihood of collision of wireless communications may increase (e.g., a rush condition can occur). Accordingly, in an embodiment instead of initiating a RACH procedure (e.g., to receive a message from the eNB 104) immediately after receiving a paging subframe or at the first RACH anchor after the paging subframe, a UE 106 can start with a non-zero backoff window 480. In some aspects, the backoff window 480 can be counted from the paging subframe which paged the UE 106, from the first RACH anchor after the paging subframe which paged the UE 106, or from some other defined causal anchor point. The size of the backoff window 480 can be random (e.g., across the paged UEs 106), and may be up to the size of a max window size for a UE 106. After the expiration of the backoff window 480, the UE 106 can initiate a RACH procedure at the next-occurring RACH anchor 485.

In certain aspects, the size of the backoff window 480 can be an absolute amount, or a function of the DMTC periodicity (e.g., the size of the DMTC period 460 in which each DMTC window 470 occurs, or the time between successive DMTC windows 470). For example, in an embodiment, the backoff window 480 size may be less than or equal to the DMTC periodicity (e.g., a fraction or a percentage thereof). Beneficially, the UEs 106 attempting to connect with the eNB 104 may be able to do so with a lower probability of collision, and without much additional delay. Thus, a better UE population delay profile may be achieved, as compared to embodiments that do not utilize a backoff window or delay. In another embodiment, the backoff window 480 size can be greater than the DMTC periodicity. In some aspects, the size of the backoff window 480 may be based on a classification of each UE 106, or on a paging priority.

In an embodiment, the size of the backoff window 480 is determined by the UE 106 that is paged. In another embodiment, the size of the backoff window 480 is determined by the eNB 104 and communicated to the UE 106 being paged. For example, the eNB 104 may signal the backoff window 480 size in a broadcast message, or in the paging subframe which pages the UE 106.

In some aspects, the eNB 104 may provide a paging occasion 495 outside of the DMTC window 470. Such paging may be allowed for all UEs 106, or only a portion of the UEs 106. However, providing the paging occasion 495 outside of the DMTC window 470 may be subject to the eNB 104 winning regular medium contention. For example, in some aspects, the eNB 104 may not be able to utilize higher-priority medium contention mechanisms outside of the DMTC window 470, and may therefore have a lower chance of securing the wireless medium. Even so, there may be additional benefits of providing paging occasions outside of the DMTC window 470. For example, if UEs 106 with low priority traffic are assigned to utilize this protocol, use of the wireless medium may be optimized, as these UEs 106 can afford to miss paging occasions (at least for a longer period of time than UEs 106 with high-priority traffic). In various embodiments, the paging occasion 495 may be a window of time in which paging indications may be sent, such as 6 ms. In some aspects, UEs 106 assigned to listen to paging occasions outside the DMTC window 470 may not be allowed (e.g., assigned) to also listen for paging occasions inside of the DMTC window 470, or vice versa. In other aspects, UEs 106 may be assigned paging occasions both inside and outside of the DMTC window 470 (e.g., within the same DMTC period 460 or DRX cycle, or among different DMTC periods 460 or DRX cycles). For example, in an embodiment UE 106a may be assigned to a single paging opportunity per DRX cycle (e.g., inside the paging occasion 495 or inside the DMTC window 470, but not both).

In some aspects, the assignment of a UE 106 to a particular paging opportunity may vary from one DRX cycle to the next. For example, in an embodiment UE 106a may be assigned to paging opportunities occurring outside of the DMTC window 470 in every DRX cycle, except for every Mth DRX cycle. In the Mth DRX cycle, the UE 106a may be assigned to a paging opportunity occurring inside of the DMTC window 470. In an embodiment, UE 106a may listen inside the DMTC window 470 based on the truth value of:

$f_1(UE_{ID})==f_2(SFN, DRX_{paging})$, where $f_1(UE_{ID})=UE_{ID}$ mod M, and $f_2(SFN, DRX_{paging})=\text{floor}(SFN/DRX_{paging})$ mod M.

In accordance with this embodiment, $UE_{ID}$ may be an identifier of the UE 106a, SFN may equal the system frame number, and $DRX_{paging}$ may equal the number of the current DRX cycle. Thus, lowering the value of M can increase the odds that the UE 106a will receive a paging indication. Further, utilizing the M value in this manner can help to insure that the UE 106a receives paging indications at some point, and does not always have to rely upon the eNB 104 winning regular medium contention. In other embodiments, UE 106*a* can be assigned to paging opportunities occurring inside of the DMTC window 470 in every DRX cycle, except for every Mth DRX cycle, in which the UE 106*a* may be assigned to a paging opportunity occurring outside of the DMTC window 470. Thus, additional management operations of wireless communications in an unlicensed spectrum may be provided.

Figure 5:
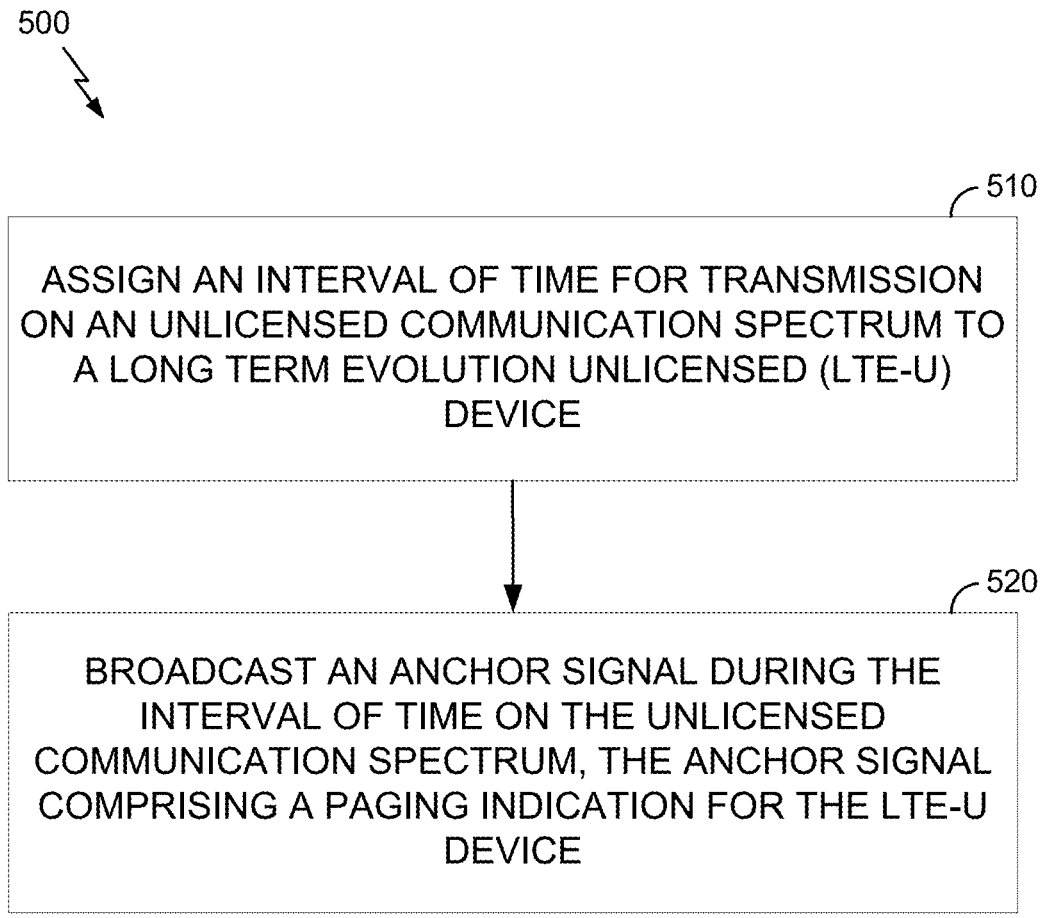
FIG. 5 is a flowchart of an exemplary method of wireless communication, in accordance with an embodiment.

FIG. 5 is a flowchart of an exemplary method 500 of wireless communication, in accordance with an embodiment. The method 500 is described as implemented by the eNB 104. However, as would be understood by one of ordinary skill in the art, the method 500 or some variation thereof may be implemented by one or more other suitable electronic devices, such as wireless devices 202 of FIG. 2, or the UE 106 of FIG. 1. Although blocks may be described as occurring in a certain order, the blocks can be reordered, blocks can be omitted, and/or additional blocks can be added.

At operation block 510, the eNB 104, for example, assigns an interval of time for transmission on an unlicensed communication spectrum to a long term evolution unlicensed (LTE-U) device. In some aspects, the LTE-U device can be the UE 106*a* of FIG. 1. In an embodiment, the interval of time comprises a DMTC window within a DRX cycle. In another embodiment, a start of the DMTC window is assigned to the LTE-U device based on: $RUE_D$ mod $N_{DMTC})*DMTC_{period\_frames}*N_{subframes\_per\_frame}+DMTC_{offset\_frame}$], wherein $UE_{ID}$ comprises an identifier of the LTE-U device, wherein $N_{DMTC}$ comprises a number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where an anchor signal is located. In yet another embodiment, $N_{DMTC}$ is based on a duration of the DRX cycle divided by a duration of a transmission period in which the DMTC window occurs.

At operation block 520, the eNB 104, for example, broadcasts an anchor signal during the interval of time on the unlicensed communication spectrum, the anchor signal comprising a paging indication for the LTE-U device. In an embodiment, the paging indication comprises a RNTI for the LTE-U device. In another embodiment, the anchor signal comprises an eDRS. In an embodiment, the anchor signal comprising the paging indication is sent with a pilot that uses DRS pilot scrambling. In some aspects, the anchor signal In some aspects of block 510, the anchor signal includes an enhanced discovery reference signal.

Additionally or alternatively, as part of method 500, the eNB 104, for example, may transmit an additional paging indication to the LTE-U device outside of the assigned interval, based on at least one of a priority of the LTE-U device, a priority of a message for the LTE-U device buffered by the access point, a failure of the access point to gain the medium during the assigned interval, a paging capacity of the access point, and a determination by the access point that the LTE-U device is monitoring paging indications outside of the assigned interval. For example, in an embodiment, paging indications for lower priority devices or messages may be transmitted outside of a DMTC window. In an embodiment, a subframe containing the additional paging indication is sent with a pilot that uses subframe-specific scrambling when the subframe is transmitted outside of the DMTC window.

In some aspects, the interval of time assigned in block 510 may be assigned to fall outside of the downlink monitoring transmission configuration (DMTC) window. The interval may be assigned instead to fall within a discontinuous reception (DRX) cycle. In some aspects, the assignment of the interval of time is based on, or in response to, a determination of paging capacity of the access point.

Additionally or alternatively, as part of method 500, the eNB 104, for example, may connect with the LTE-U device based on a RACH procedure after broadcasting the anchor signal. In some aspects, as part of method 500, the eNB 104, for example, may assign a backoff interval to the LTE-U device, the backoff interval comprising a window of time after the anchor signal is broadcast. Thus, in another embodiment, the eNB 104 may connect with the LTE-U device based on a RACH procedure after the backoff interval has expired after broadcasting the anchor signal.

Figure 6:
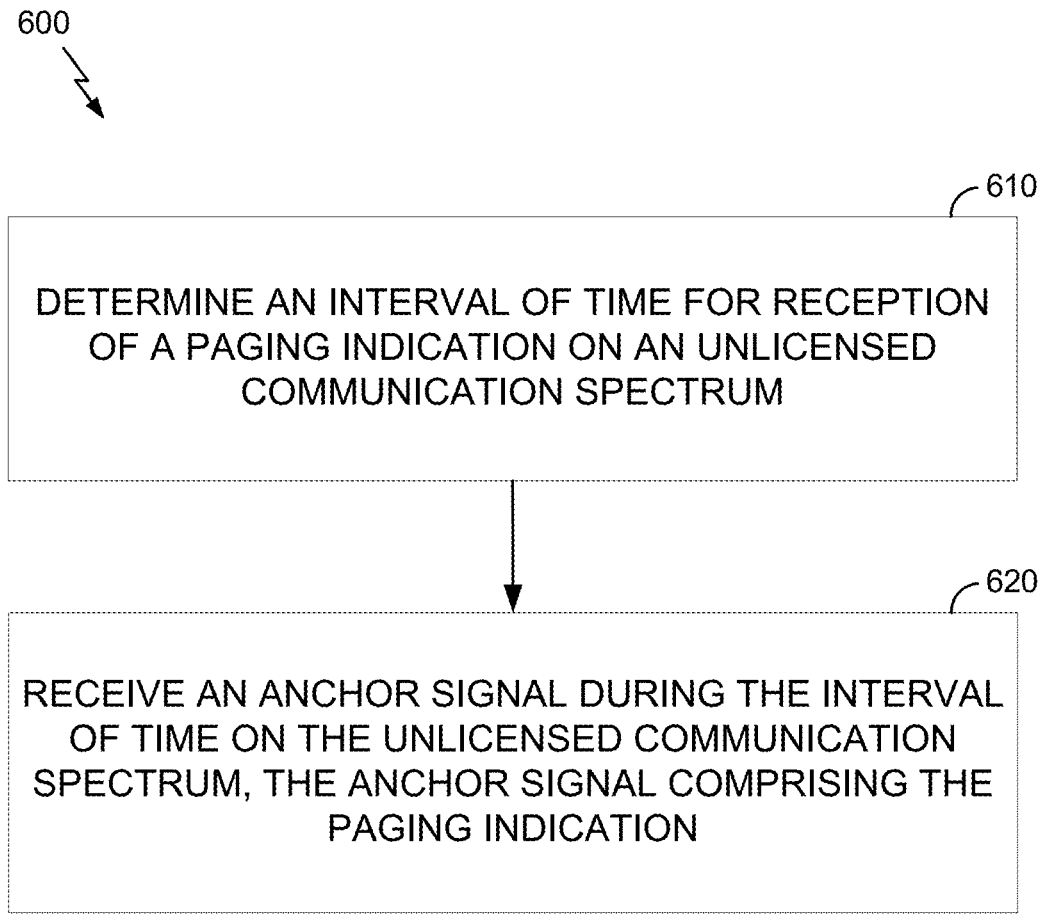
FIG. 6 is another flowchart of an exemplary method of wireless communication, in accordance with an embodiment.

FIG. 6 is another flowchart of an exemplary method 600 of wireless communication, in accordance with an embodiment. The method 600 is described as implemented by the UE 106. However, as would be understood by one of ordinary skill in the art, the method 600 or some variation thereof may be implemented by one or more other suitable electronic devices, such as wireless devices 202 of FIG. 2, or the eNB 104 of FIG. 1. Although blocks may be described as occurring in a certain order, the blocks can be reordered, blocks can be omitted, and/or additional blocks can be added.

At operation block 610, the UE 106*a*, for example, may determine an interval of time for reception of a paging indication on an unlicensed communication spectrum. In an embodiment, the interval of time comprises a DMTC window within a DRX cycle. In another embodiment, a start of the DMTC window is determined based on [($UE_D$ mod $N_{DMTC})*DMTC_{period\_frames}*N_{subframes\_per\_frame}+DMTC_{offset\_frame}$], wherein $UE_{ID}$ comprises an identifier of the LTE-U device, wherein $N_{DMTC}$ comprises a number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where an anchor signal is located. In yet another embodiment, $N_{DMTC}$ is based on a duration of the DRX cycle divided by a duration of a transmission period in which the DMTC window occurs.

At operation block 620, the UE 106*a*, for example, may receive an anchor signal during the interval of time on the unlicensed communication spectrum, the anchor signal comprising the paging indication. In some aspects, the anchor signal can be transmitted by the eNB 104 of FIG. 1. In an embodiment, the paging indication comprises a RNTI for the LTE-U device. In another embodiment, the anchor signal comprises an eDRS. In an embodiment, the anchor signal comprising the paging indication is received with a pilot that uses DRS pilot scrambling.

Additionally or alternatively, as part of method 600, the UE 106, for example, may receive an additional paging indication outside of the assigned interval. In some aspects, receiving the additional paging indication in this manner may be based on at least one of a device priority (a priority of the LTE-U device), a priority of a message for the LTE-U device buffered by an access point, a determination by the LTE-U device that no subframes containing the paging indication were sent within the assigned interval, and a determination by the LTE-U device to monitor paging indication outside of the assigned interval. For example, in an embodiment, paging indications for lower priority devices or messages may be transmitted outside of a DMTC window. In some aspects, a subframe containing the additional paging indication is sent with a pilot that uses subframe-specific scrambling when the subframe is sent outside of a DMTC window.

Additionally or alternatively, as part of method 600, the UE 106, for example, may initiate a RACH procedure with an access point after receiving the anchor signal. In an embodiment, the UE 106 may further determine a backoff interval to wait for after reception of the anchor signal. Thus, in accordance with this embodiment, the LTE-U device may initiate a RACH procedure with an access point after waiting for the backoff interval after receiving the anchor signal. Additionally or alternatively, as part of method 600, the UE 106, for example, may decode the paging indication. In an embodiment, after decoding the paging indication, the UE 106 can stop listening if the paging indication is not for the LTE-U device.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication comprising:
assigning, by an access point, an interval of time for transmission to a device configured for operation on an unlicensed communication spectrum, the interval of time being assigned to the device at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device;
assigning the interval of time to fall outside the DMTC window in response to a determination of paging capacity of the access point; and
broadcasting, by the access point, an anchor signal during the interval of time on the unlicensed communication spectrum, the anchor signal comprising a paging indication for the device;
wherein a start of the DMTC window is assigned to the device based on
($UE_{ID}$ mod $N_{DMTC}$)*$DMTC_{period\_frames}$*$N_{subframes\_per\_frame}$+$DMTC_{offset\_frame}$, wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

2. The method of claim 1, wherein $N_{DMTC}$ is based on a duration of the DRX cycle divided by a duration of a transmission period in which the DMTC window occurs.

3. The method of claim 1, further comprising:
transmitting, by the access point, an additional paging indication to the device outside of the interval of time, based on at least one of:
a priority of the device,
a priority of a message for the device buffered by the access point,
a failure of the access point to gain access to a wireless medium during the interval of time, and
a determination by the access point that the device is monitoring paging indications outside of the interval of time.

4. The method of claim 1, further comprising:
assigning, by the access point, a backoff interval to the device, the backoff interval comprising a window of time after the anchor signal is broadcast; and
connecting, by the access point, with the device based on a random access channel (RACH) procedure after broadcasting the anchor signal, based on the backoff interval.

5. The method of claim 1, wherein the anchor signal comprises an enhanced discovery reference signal.

6. A method of wireless communication comprising:
assigning, by an access point, an interval of time for transmission to a device configured for operation on an unlicensed communication spectrum, the interval of time being assigned to the device at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device;
assigning the interval of time to fall outside the DMTC window in response to a determination of paging capacity of the access point; and
broadcasting, by the access point, an anchor signal during the interval of time on the unlicensed communication spectrum, the anchor signal comprising a paging indication for the device;
wherein a start of the DMTC window is assigned to the device based at least in part on the identifier of the device modulo a number of DMTC windows within the DRX cycle;
transmitting, by the access point, an additional paging indication to the device outside of the interval of time, based on at least one of:
a priority of the device,
a priority of a message for the device buffered by the access point,
a failure of the access point to gain access to a wireless medium during the interval of time, and
a determination by the access point that the device is monitoring paging indications outside of the interval of time;
wherein a subframe containing the additional paging indication is sent with a pilot that uses subframe-specific scrambling when the subframe is transmitted outside of the downlink monitoring transmission configuration (DMTC) window.

7. A method of wireless communication comprising:
determining, by a device configured for operation on an unlicensed communication spectrum, an interval of time for reception of a paging indication on the unlicensed communication spectrum, the interval of time being determined at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and receiving, by the device, an anchor signal during the interval of time on the unlicensed communication spectrum, the anchor signal comprising the paging indication;

wherein a start of the DMTC window is determined based on $(UE_{ID} \bmod N_{DMTC})*DMTC_{period\_frames}*N_{subframes\_per\_frame}+DMTC_{offset\_frame}$, wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

8. The method of claim 7, wherein $N_{DMTC}$ is based on a duration of the DRX cycle divided by a duration of a transmission period in which the DMTC window occurs.

9. The method of claim 7, further comprising:
receiving, by the device, an additional paging indication outside of the interval of time based on at least one of:
a priority of the device,
a priority of a message for the device buffered by an access point,
a determination by the device that no subframes containing the paging indication were sent within the interval of time, and
a determination by the device to monitor paging indication outside of the interval of time.

10. The method of claim 7, further comprising:
determining, by the device, a backoff interval to wait for after reception of the anchor signal; and
initiating, by the device, a random access channel (RACH) procedure with an access point after waiting for the backoff interval after receiving the anchor signal.

11. The method of claim 7, further comprising:
decoding, by the device, the paging indication; and
stop listening for further paging indicators within the interval of time by the device, after decoding the paging indication.

12. A method of wireless communication comprising:
determining, by a device configured for operation on an unlicensed communication spectrum, an interval of time for reception of a paging indication on the unlicensed communication spectrum, the interval of time being determined at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
receiving, by the device, an anchor signal during the interval of time on the unlicensed communication spectrum, the anchor signal comprising the paging indication;
wherein a start of the DMTC window is determined based at least in part on the identifier of the device modulo a number of DMTC windows within the DRX cycle;
receiving, by the device, an additional paging indication outside of the interval of time based on at least one of:
a priority of the device,
a priority of a message for the device buffered by an access point,
a determination by the device that no subframes containing the paging indication were sent within the interval of time, and
a determination by the device to monitor paging indication outside of the interval of time;
wherein a subframe containing the additional paging indication is received with a pilot that uses subframe-specific scrambling when the subframe is received outside of the downlink monitoring transmission configuration (DMTC) window.

13. An access point for wireless communication, the access point comprising:
an electronic hardware processor configured to assign an interval of time for transmission to a device configured for operation on an unlicensed communication spectrum, the interval of time being assigned to the device at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
a transmitter configured to broadcast an anchor signal during the interval of time on the unlicensed communication spectrum, the anchor signal comprising a paging indication for the device;
wherein a start of the DMTC window is assigned to the device based on $(UE_{ID} \bmod N_{DMTC})*DMTC_{period\_frames}*N_{subframes\_per\_frame}+DMTC_{offset\_frame}$,
wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

14. The access point of claim 13, wherein the processor is further configured to assign the interval of time to fall outside a downlink monitoring transmission configuration (DMTC) window in response to a determination of paging capacity of the access point.

15. The access point of claim 13, wherein the electronic hardware processor is further configured to determine $N_{DMTC}$ based on a duration of the DRX cycle divided by a duration of a transmission period in which the DMTC window occurs.

16. The access point of claim 13, wherein the transmitter is further configured to transmit an additional paging indication to the device outside of the assigned interval of time, and wherein the electronic hardware processor is further configured to determine when to transmit the additional paging indication based on at least one of:
a priority of the device,
a priority of a message buffered for the device,
a failure to gain access to a wireless medium during the assigned interval of time, and
a determination that the device is monitoring paging indications outside of the assigned interval of time.

17. The access point of claim 13, wherein the electronic hardware processor is further configured to:
assign a backoff interval to the device, the backoff interval comprising a window of time after the anchor signal is broadcast; and connect with the device based on a random access channel (RACH) procedure after broadcasting the anchor signal, based on the backoff interval.

18. An access point for wireless communication, the access point comprising:
an electronic hardware processor configured to assign an interval of time for transmission to a device configured for operation on an unlicensed communication spectrum, the interval of time being assigned to the device at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
a transmitter configured to broadcast an anchor signal during the interval of time on the unlicensed communication spectrum, the anchor signal comprising a paging indication for the device;
wherein a start of the DMTC window is assigned to the device based at least in part on the identifier of the device modulo a number of DMTC windows within the DRX cycle;
wherein the transmitter is further configured to transmit an additional paging indication to the device outside of the assigned interval of time, and wherein the electronic hardware processor is further configured to determine when to transmit the additional paging indication based on at least one of:
a priority of the device,
a priority of a message buffered for the device,
a failure to gain access to a wireless medium during the assigned interval of time, and
a determination that the device is monitoring paging indications outside of the assigned interval of time;
wherein the electronic hardware processor is further configured to generate a subframe containing the additional paging indication with a pilot that uses subframe-specific scrambling when the subframe is to be transmitted outside of the downlink monitoring transmission configuration (DMTC) window, wherein the transmitter is further configured to transmit the subframe.

19. A device configured for wireless communication on an unlicensed communication spectrum, the device comprising:
an electronic hardware processor configured to determine an interval of time for reception of a paging indication on the unlicensed communication spectrum, the interval of time being determined at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
a receiver configured to receive an anchor signal during the interval of time on the unlicensed communication spectrum, the anchor signal comprising the paging indication;
wherein a start of the DMTC window is determined based on $(UE_{ID}$ mod $N_{DMTC})*DNITC_{period\_frames}*N_{subframes\_per\_frame}+DMTC_{offset\_frame}$, wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

20. The device of claim 19, wherein the electronic hardware processor is further configured to determine $N_{DMTC}$ is based on a duration of the DRX cycle divided by a duration of a transmission period in which the DMTC window occurs.

21. The device of claim 19, wherein the receiver is further configured to receive an additional paging indication outside of the determined interval, and wherein the electronic hardware processor is further configured to determine when to receive the additional paging indication based on at least one of:
a device priority,
a priority of a message buffered by an access point,
a determination that no subframes containing the paging indication were sent within the determined interval, and
a determination to monitor paging indications outside of the determined interval.

22. The device of claim 19, wherein the electronic hardware processor is further configured to:
determine a backoff interval to wait for after reception of the anchor signal; and
initiate a random access channel (RACH) procedure with an access point after waiting for the backoff interval after receiving the anchor signal.

23. The device of claim 19, wherein the electronic hardware processor is further configured to:
decode the paging indication; and
stop listening for further paging indicators within the interval of time, after decoding the paging indication.

24. A device configured for wireless communication on an unlicensed communication spectrum, the device comprising:
an electronic hardware processor configured to determine an interval of time for reception of a paging indication on the unlicensed communication spectrum, the interval of time being determined at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
a receiver configured to receive an anchor signal during the interval of time on the unlicensed communication spectrum, the anchor signal comprising the paging indication;
wherein a start of the DMTC window is determined based at least in part on the identifier of the device modulo a number of DMTC windows within the DRX cycle;
wherein the receiver is further configured to receive an additional paging indication outside of the determined interval, and wherein the electronic hardware processor is further configured to determine when to receive the additional paging indication based on at least one of:
a device priority,
a priority of a message buffered by an access point,
a determination that no subframes containing the paging indication were sent within the determined interval, and
a determination to monitor paging indications outside of the determined interval;

wherein the receiver is further configured to receive a subframe containing the additional paging indication with a pilot that uses subframe-specific scrambling when the subframe is received outside of the downlink monitoring transmission configuration (DMTC) window.

25. An access point for wireless communication, the access point comprising:
means for assigning an interval of time for transmission to a device configured for operation on an unlicensed communication spectrum, the interval of time being assigned to the device at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
means for broadcasting an anchor signal during the interval of time on the unlicensed communication spectrum, the anchor signal comprising a paging indication for the device;
wherein a start of the DMTC window is determined based on $(UE_{ID}\ mod\ N_{DMTC})*DMTC_{period\_frames}*N_{subframes\_per\_frame}+DMTC_{offset\_frame}$,
wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

26. A device configured for wireless communication on an unlicensed communication spectrum, the device comprising:
means for determining an interval of time for reception of a paging indication on the unlicensed communication spectrum, the interval of time being determined at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
means for receiving an anchor signal during the interval of time on the unlicensed communication spectrum, the anchor signal comprising the paging indication;
wherein a start of the DMTC window is determined based on $(UE_{ID}\ mod\ N_{DMTC})*DMTC_{period\_frames}*N_{subframes\_per\_frame}+DMTC_{offset\_frame}$,
wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

27. A non-transitory computer-readable medium having stored thereon instructions that, when executed, cause a processor of an access point to:
assign an interval of time for transmission to a device configured for operation on an unlicensed communication spectrum, the interval of time being assigned to the device at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
broadcast an anchor signal during the interval of time on the unlicensed communication spectrum, the anchor signal comprising a paging indication for the device;
wherein a start of the DMTC window is assigned to the device based on $(UE_{ID}\ mod\ N_{DMTC})*DMTC_{period\_frames}*N_{subframes\_per\_frame}+DMTC_{offset\_frame}$,
wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

28. A non-transitory computer-readable medium having stored thereon instructions that, when executed, cause a processor of a device configured for operation on an unlicensed communication spectrum to:
determine an interval of time for reception of a paging indication on the unlicensed communication spectrum, the interval of time being determined at least in part based on a random distribution function and at a time that falls outside a downlink monitoring transmission configuration (DMTC) window and within a discontinuous reception (DRX) cycle, wherein the random distribution function is for setting the interval of time as a function of an identifier of the device; and
receive an anchor signal during the interval of time on the unlicensed communication spectrum, the anchor signal comprising the paging indication;
wherein a start of the DMTC window is determined based on $(UE_{ID}\ mod\ N_{DMTC})*DMTC_{period\_frames}*N_{subframes\_per\_frame}+DMTC_{offset\_frame}$,
wherein $UE_{ID}$ comprises the identifier of the device, wherein $N_{DMTC}$ comprises the number of DMTC windows within the DRX cycle, wherein $DMTC_{period\_frames}$ comprises a number of frames between subsequent DMTC windows, wherein $N_{subframes\_per\_frame}$ comprises a number of subframes in each frame, and wherein $DMTC_{offset\_frame}$ comprises a number of subframes from a start time of the DMTC window where the anchor signal is located.

* * * * *